United States Patent [19]
Ono et al.

[11] 4,191,974
[45] Mar. 4, 1980

[54] FACSIMILE ENCODING COMMUNICATION SYSTEM

[75] Inventors: Fumitaka Ono; Takayoshi Semasa; Yutaka Ueno; Shuzi Iwata, all of Amagasaki, Japan

[73] Assignee: Mitsubishi Denki Kabushiki Kaisha, Tokyo, Japan

[21] Appl. No.: 875,909

[22] Filed: Feb. 7, 1978

[30] Foreign Application Priority Data

Feb. 8, 1977 [JP] Japan ................................. 52-13432
Jun. 8, 1977 [JP] Japan ................................. 52-68233

[51] Int. Cl.² .............................................. H04N 1/00
[52] U.S. Cl. .............................. 358/261; 340/347 DD; 358/260
[58] Field of Search ............................... 358/260, 261; 340/347 DD

[56] References Cited

U.S. PATENT DOCUMENTS 4,028,731  6/1977  Arps ....................................... 358/260
4,070,694  1/1978  Sakamoto ............................. 358/260

OTHER PUBLICATIONS

*Bell System Technical Journal*, vol. 55, No. 10 (Dec. 1976), pp. 1539-1552.

Primary Examiner—Howard W. Britton
Attorney, Agent, or Firm—Wenderoth, Lind & Ponack

[57] ABSTRACT

Binary 0's and 1's from picture elements in each line are counted with respect to each mode determined by adjacent picture elements to form symbol patterns determined by both the counts and the information content of a memory. Each pattern is encoded into a code word to be transmitted having a bit number determined by the arrangement of binary symbols included in it. Also the code words can be transmitted on the basis of address numbers of picture elements, starting with the output from a coder associated with a mode having the two-valued signal with the least address number.

3 Claims, 11 Drawing Figures

| REF. PATTERN | PROB. OF WHITE X | PROB. OF BLACK X | INFO CONT. |
|---|---|---|---|
| ○○○ / ○✕ | .995 | .005 | .045 |
| ◍○○ / ◍✕ | .625 | .375 | .954 |

FIG. 3

| SYMBOL PATTERN | CODE LENGTH |
|---|---|
| o—— $2^m$ ——o | 1 |
| o | $m+1$ |
| o —$2^m$— o | $m+1$ |
| o —— o | $m+1$ |

FIG. 7

| PAUSE-OF-LINE | $S_1$ | $S_2$ | ------ | PAUSE-OF-MODE | $W_1$ | $W_2$ | ------ |

FIG. 10

| PAUSE-OF-LINE | $S_1$ | $W_1$ | $W_2$ | $W_3$ | $S_2$ | $W_4$ | $W_5$ | ------ |

FIG. 4

CODE USED IN S MODE

| SYMBOL | CODE WORD |
|---|---|
| 0  0  0  0 | 0 |
|  | 1  0  0 |
| 0  1 | 1  0  1 |
| 0  0  1 | 1  1  0 |
| 0  0  0  1 | 1  1  1 |

CODE USED IN W MODE

| SYMBOL | CODE WORD |
|---|---|
| 0  0 | 0 |
| 1 | 1  0 |
| 0  1 | 1  1 |

FACSIMILE ENCODING COMMUNICATION SYSTEM

BACKGROUND OF THE INVENTION

This invention relates to an encoding communication system used with facsimiles or the like for transmitting images of pictures and writings at high speed. Particularly the present invention relates to a code selection device and a mode selection device used in such an encoding communication system.

Since picture elements constituting the total picture or writing area generally have a two-dimensional correlation, any object picture element destined to be next encoded has an information content which differs with the state to which it belongs. The term "state" used herein means the pattern in which picture elements adjacent to that object picture element and selected as reference points are arranged. Therefore, for effectively encoding picture elements it is required to allot to those picture elements codes whose code lengths depend upon their occurrence frequencies. Accordingly, when only one code form is used, the resulting efficiency has a limit. It is desirable to specify the property of the information sources and prepare a desired number of code forms for selecting from among these code form that code form suited for the property of the particular information source.

Also because many pictures and writings require generation of code word-lengths different from one point to another thereon, the data is often temporarily stored in a memory and read out from the memory at a constant speed matching with the speed at which the readout codes are delivered to the transmission channel involved. Under these circumstances, if code words to be transmitted having low information content may be continuously delivered to the channel then the code words delivered to the channel are generally intermittent. For this reason, it has been previously proposed to additionally prepare special dummy codes and deliver them to the channel independently of picture elements, when the content stored in the memory is reduced to a predetermined magnitude or less.

Consequently, the most desirable form of such a system is first to prepare a desired number of code forms and then to normally select that code form having the shortest code length whereas when the content in the associated memory is reduced to a predetermined magnitude or less, selecting the code form having the shortest code length among the remaining code forms as determined by the particular code delivery speed. In such a system it has been necessary to perform the encoding operation concerning all the code forms prepared for coded signal sequences involved in order to effect the code selection, to provide a memory in which codes with different code lengths are stored, and to compare the code lengths with one another. This has resulted in the problem that, as the number of the code forms increases, the processing speed must increase and the memory capacity for the code length must increase and so on. Thus the measure as described above has scarcely been put to practical use and there have been generally employed systems including fixed codes and dummy codes additionally prepared.

Accordingly it is a general object of the present invention to eliminate the disadvantages of the prior art practice as described above.

It is an object of the present invention to provide in an encoding communication systems a new and improved code selection device for counting the binary symbols included in a sequence of signals to be encoded and utilizing the resulting counts without the necessity of performing the encoding operation concerning all available code forms and counting the code lengths.

It is still another object of the present invention to provide in an encoding communication systems a new and improved code selection device for selecting codes suited for the property of the particular information source to thereby eliminate the necessity of increasing the processing speed in accordance with the number of available code forms and also of providing a codelength memory.

It is a further object of the present invention to provide a new and improved encoding communication system eliminating the transmission of a pause-of-mode signal indicating a change from one mode to another mode to increase the efficiency of transmission of coded signals.

SUMMARY OF THE INVENTION

The present invention provides an encoding communication system for facsimiles signals comprising means for sequentially obtaining prediction signals for picture elements adjacent to object picture elements in accordance with a predetermined prediction function and means for comparing the prediction signals with the corresponding object picture-element signals to encode a sequence of prediction error signals and to transmit the sequence of the encoded signals, which system includes a means for properly effecting the encoding or transmission.

In a preferred embodiment of the present invention the encoding communication system may comprise a sensor means for sensing a when the length of a code word sequence to be transmitted is not more than a predetermined value as determined by the delivery speed at which the code words are delivered to an associated transmission channel, and a code selection means for counting binary symbols in a sequence of signals to be encoded respectively, effecting the calculation as determined by the respective counts, and comparing the result of the calculation with said predetermined value and another predetermined value as determined by the number of the binary symbols, and code selection means for selecting one of preliminarily prepared code forms dependent upon the result of the comparison.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENTS

For a better understanding of the nature of the present invention, a description will first be made, in terms of a reference pattern, of the signals used with the present invention and their code symbols.

Figure 1:
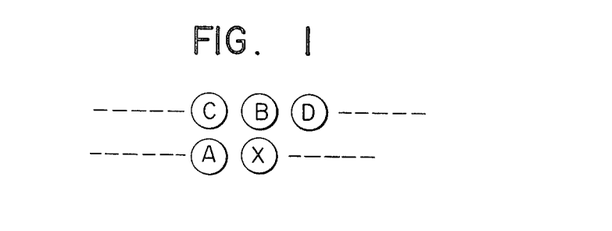
FIG. 1 is an enlarged diagram of a portion of an array of an object picture element distined to be next encoded and adjacent picture elements selected as reference points.

Among picture elements constituting the total picture area, that picture element destined to be next encoded is called herein the object picture element such as designated by a circle labelled X in FIG. 1. FIG. 1 also shows four circles A, B, C and D designating the picture elements adjacent to the object picture element X forming a reference pattern. The reference pattern defines a state to which the object picture element belongs.

The term "picture element" used herein and in the appended claims includes both the elementary area of any picture and that of any writing.

Figure 2:
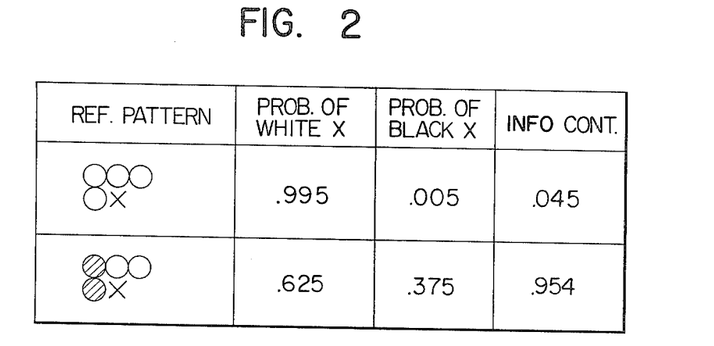
FIG. 2 is a table illustrating a change in information content of the object picture element in accordance with the pattern of the reference picture elements shown in FIG. 1.

As above described, any object picture element has a much different information content depending upon the state which it belongs. FIG. 2 describes, by way of example, the change in information content of the object picture element X due to the state of the object picture element. As seen from FIG. 2, the object picture element has an information content of 0.045 for a first reference pattern including four white picture elements as shown in the upper row of FIG. 2 but has an information content of 0.954 for a second reference pattern including two white elements and two black elements as shown in the lower row. Also the probability of a white X is 0.955 for the first reference pattern and 0.625 for the second reference pattern while the probability of a black X is 0.005 for the first reference pattern and 0.375 for the second reference pattern.

The figures just described result from statistics obtained with specified pictures and writings but it may be analogized that FIG. 2 will depict the general tendency to change the information content of an object picture element in accordance with the state to which the latter belongs.

Therefore, upon effectively encoding the information content of each picture element, it is required to allot to each information content an encoded symbol having a code length dependent upon the frequency of occurrence thereof. In view of the efficiency, it is desirable to prepare any desired number of code forms for information sources whose property is specified and to select that code form fitted for the property of the particular information source.

In FIG. 1, the encoding may be effected, for example, in the order of the picture elements C,B,D, . . . , A,X, . . .

Also since different picture elements have different lengths of code words caused therefrom, it has been a common practice to temporarily store data from the picture elements in a memory, read the data out from the memory at a predetermined constant speed matching the delivery speed at which the data is successively delivered to the associated transmission channel, and additionally to prepare special dummy codes independent of picture information. When the data stored in the memory decreases to a certain magnitude or less, the dummy codes are delivered to the transmission channel.

Figure 6:
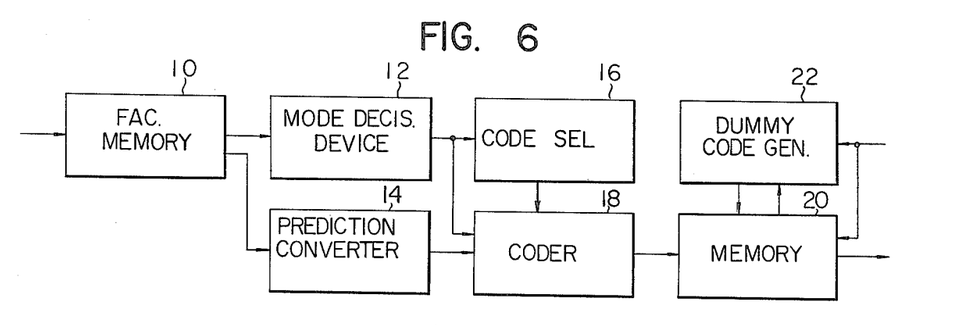
FIG. 6 is a block diagram of a conventional encoding transmission device.

Referring now to FIG. 6, there is illustrated a conventional encoding transmission device for facsimile signals. In the arrangement illustrated, the bandwidth compression of facsimile signals is accomplished by first subjecting data from an object picture element to mode separation and conversion using prediction signals in accordance with an associated reference pattern and then encoding the converted value which is a prediction error signal. More specifically, a facsimile signal from each picture element is temporarily stored in a facsimile memory 10. The stored signal is applied to a mode decision device 12 where its mode is determined and also to a prediction converter 14 where the conversion is effected by using a predictive value.

The mode decision device 12 is connected to both a code selector 16 and a coder 18. The converter 14 and the code selector 16 are also connected to the coder 18. Therefore the converted value from the prediction converter 14 is applied to the coder 18 where it is encoded as determined by the output from the code selector 16. Since the codes for each mode remain unchanged in the prior art practice, code forms have been differently specified with the modes. Thus the coder 18 encodes the converted value from the converter 14 in accordance with that code form as directed by the code selector 16 and the signal thus encoded is stored in a memory 20.

Although the mode separation and prediction of facsimile signals may be variously accomplished, a run length encoding process in which each object picture element is subjected to mode separation and prediction with respect to the adjacent picture element to the left thereof is the simplest.

Next the memory 20 sequentially delivers the stored data to an associated transmission channel (not shown) at a predetermined data delivery speed.

On the other hand, when a dummy code generator 22 receives a signal indicating that there is less data stored in memory 20 than a predetermined magnitude corresponding to the data delivery speed of the transmission channel, the dummy code generator 22 immediately writes dummy codes in the memory 20. Memory 20, in turn, delivers the dummy codes to the transmission channel. Therefore data delivery continues at the predetermined delivery speed.

As described above in conjunction with FIG. 2, the information content of an object picture element differs with the state to which the object element belongs. Therefore, for greatest efficiency of transmission of information it is desirable to encode signals by dividing them into a pair of signal sequences. This measure has been employed in conventional encoding communication a device. One example of such devices will now be described for the purpose of comparing the present invention with the prior art practice.

When signals are divided into two signal sequences in the prior art devices, those signal sequences are called S and W respectively and the states belonging to the signal sequences S and W are called the S mode and the W mode respectively. A signal $M_S$ in the S mode is defined by $$M_S = ABD + \overline{ABD} \tag{1}$$

where A, B and D designate signals for determining the mode. On the other hand, a signal $M_W$ in the W mode is defined by $$M_W = 1 - M_S \tag{1'}$$

Also a signal $\hat{X}$ occurring at a higher frequency in each state is called a prediction signal and defined by $$\hat{X} = AB + (A+B)\overline{C} \tag{2}$$

The signals A, B, C and D originate from the respective reference elements A, B, C and D as shown in FIG. 1.

Figure 3:
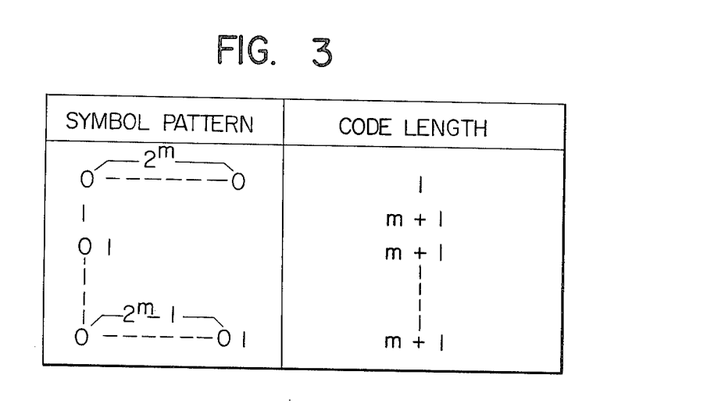
FIG. 3 is a table illustrating code symbols with the order m and corresponding code lengths as an example of the code allotment.

It is now assumed that the code allotment follows the table shown in FIG. 3. In FIG. 3 a binary symbol pattern expressed by m-bits each having a binary value of ZERO (0) has a code length 1, a binary symbol pattern having a binary value of ONE (1) in the sequence has a code length m+1 and so on. It is well known that the efficiency becomes better provided that the less the probability of occurrence of a symbol ONE (1) the higher the order $2^m$ will be. In the example illustrated, the S and W modes have respective orders m equal to two (2) and unity (1). That is, $2^m = 4$ holds in the S mode while $2^m = 2$ holds in the W mode.

Figure 4:
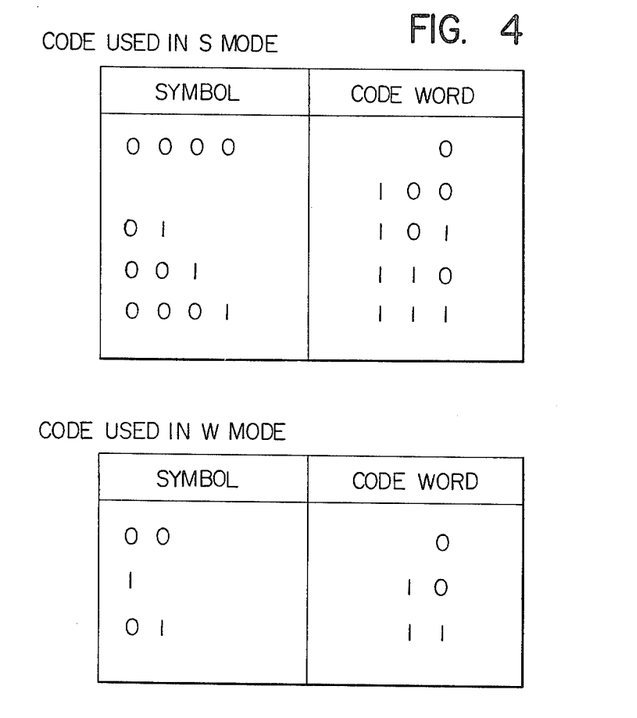
FIG. 4 is tables illustrating code symbols and corresponding code words commonly used in the field with which the present invention is concerned.

Examples of code words used in this case are illustrated in FIG. 4. For instance, a symbol pattern (0000) has a code word (0) and a symbol pattern (01) has a code word (101) in the S mode while a symbol pattern (00) has a code word (0) and a symbol pattern (01) has a code word (11) in the W mode.

Figure 5:
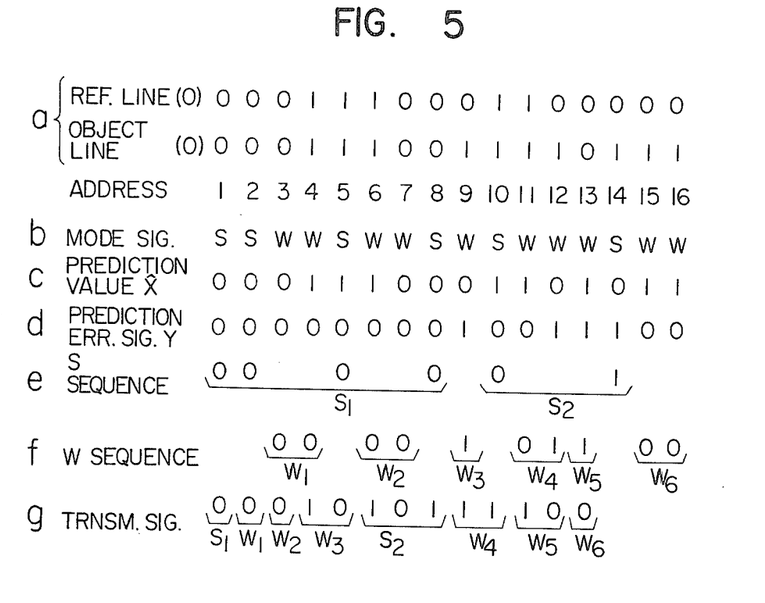
FIG. 5 is an illustration of signals developed at various points in a system for transmitting information of picture images by using the code words shown in FIG. 4.

FIG. 5 illustrates signals developed at various points in device such as shown in FIG. 6 when the code words of FIG. 4 are used. In FIG. 5 the uppermost two rows labelled a designate the original signals directly from the respective picture elements. The upper row thereof shows the signals originating from those picture elements belonging to a reference line while the lower row shows the signals originating from similar picture elements belonging to an object line that is destined to be encoded next. Each original signal is expressed by a binary symbol having a value of ONE (1) indicating that the associated picture element is "black" or a value of ZERO (0) indicating that the associated picture element is "white". The third row shows that those picture elements have respective addresses numbered 1 through 16.

By calculating the signals in the rows a in accordance with the expressions (1) and (1'), mode signals result as shown in a fourth row b. Those mode signals are designated by S or W. For example, the signal from the object picture element with the address No. 1 results in an S mode signal and the signal from the object picture element with the address No. 4 results in a W mode signal. A fifth row c shows prediction values $\hat{X}$ calculated according to the expression (2). For example, the S mode signal caused from the address No. 1 has a prediction value $\hat{X}$ equal to a ZERO and the S mode signal X caused from the address No. 10 has a prediction value X equal to ONE. When X coincides with $\hat{X}$, the X is determined by the $\hat{X}$ but if X does not coincide with $\hat{X}$, the X is determined by the inverse of $\hat{X}$. The prediction error signal Y is defined as $$Y = X \oplus \hat{X} \tag{3}$$

where the symbol "cross in circle" designates the exclusive logic sum or "OR".

Therefore it is seen from the rows a and c that the prediction error signals Y are as shown in a sixth row d of FIG. 5.

Further in FIG. 5, a seventh row e illustrates the signals Y belonging to the S sequence and a seventh row f shows those belonging to the W sequence.

Then the signals Y are encoded en bloc into code symbols as shown in FIG. 4. More specifically, the binary number (0000) shown by $S_1$ in the row e of FIG. 5 is encoded into the code word (0) and the binary number (01) shown by $S_2$ in the row e is encoded into the code word (101). On the other hand, binary numbers (00) shown by $W_1$, $W_2$ and $W_6$ in the row f of FIG. 5 are encoded into code words (0) and binary numbers (1) by $W_3$ and $W_5$ in the row f are encoded into code words (10). Further the binary number (01) shown by $W_4$ is encoded into the code word (11).

Further FIG. 5 shows in the lowermost row g the code words converted into transmission signals as described above.

Figure 7:
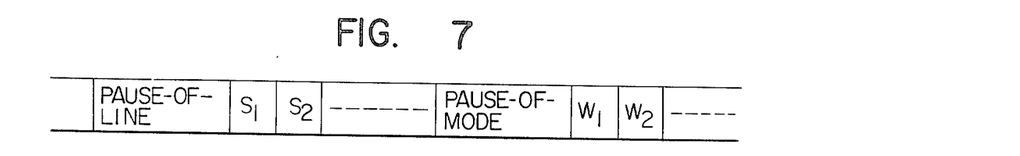
FIG. 7 is an illustration of a transmitted signal sequence used with the device shown in FIG. 6.

In data transmission effected by conventional systems, a pause-of-line signal indicating an interval between adjacent lines first enters the data transmission channel a and then a signals provided by encoding the S sequence enters the channel as shown in FIG. 7. In the example illustrated in FIG. 5, the latter signal represents the binary number sequences $S_1$ and $S_2$ by a code word (0101). Following this a pause-of-mode signal indicating a change from one to the other of the modes, in this case a change from the S mode to the W mode, enters the channel followed by a signal having the encoded W sequence as shown in FIG. 7. In FIG. 5, for example, the coded signal for the W sequence represents the binary number sequences $W_1$, $W_2$, $W_3$, $W_4$, $W_5$ and $W_6$ by a code word (001011100). Thereafter the next pause-of-line signal (not shown) is reached.

As described above, the transmission of facsimile signals have been attained previously in a limited frequency bandwidth at a speed as high as possible but the above-mentioned measure is disadvantageous because the pause-of-mode signal must enter the associated transmission channel as shown in FIG. 7. If n modes are used, (n−1) pause-of-mode signals must enter the channel with the result that the speed of transmission of the facsimile signals decreases accordingly.

In order to eliminate the necessity of encoding facsimile signals in accordance with a plurality of predetermined code forms and counting the resulting code lengths, the present invention provides a code selector for selecting codes by counting binary symbols in a sequence of signals to be encoded, effecting the logic operation of the resulting counts as predetermined and utilizing the result of the logic operation.

Figure 8:
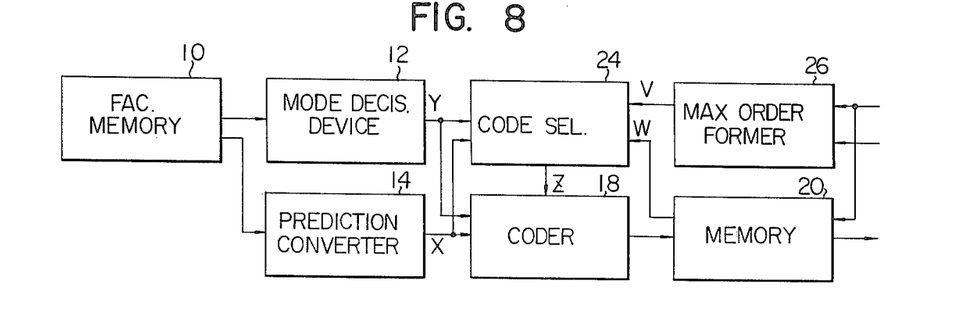
FIG. 8 is a block diagram of an encoding transmission system embodying the principles of the present invention.

Referring now to FIG. 8 wherein like reference numerals designate the components identical to those shown in FIG. 6, there is illustrated an encoding communication system for facsimile signals constructed according to the principles of the present invention. In the arrangement illustrated, the prediction converter 14 is connected to a code selector 24 having further a pair of inputs connected to the memory 20 and a maximum order former 26 respectively. The maximum order former 26 includes a pair of inputs one of which is connected to the memory 20.

In other respects, the arrangement is identical to that shown in FIG. 6. It is noted that the dummy code generator 22 shown in FIG. 6 is omitted because the code selector 24 receives a signal W concerning the length of the code word sequence stored in the memory 20.

The coder 18 effects the encoding as shown in FIG. 3 and the resulting code symbols have the order $2^m$ as directed by the output Z from the code selector 24 that also determines codes for each mode in response to the output Y from the mode decision device 12.

The operation of the maximum order former 26 will now be described. Assuming that in FIG. 3 the codes have the order $2^m$ and L designates the number of binary symbols to be encoded, the minimum code length S is expressed by $$S \geq L/2^m. \quad (4)$$

Also it is assumed that, upon encoding each line en bloc, K designates the number of picture elements disposed in each line and J designates the code length transmitted during the processing time for each line. Under the assumed condition, $$J < K/2^m \quad (5)$$

must be fulfilled.

Under these circumstances, the maximum order former 26 is operative to form a maximum value of the order $2^m$ satisfying the expression (5) from values of the J and K.

The code selector 24 is operated as follows:

It is well known that the code symbols shown in FIG. 3 have the following properties:

Upon encoding a two-valued information source, having respective probabilities of occurrence of k and 1−k of the two symbols to be encoded where k designates the probability of occurrence of binary ZERO [0] and k≧½, into the symbol patterns as shown in FIG. 3, and when the occurrence of the coded symbols to be encoded may be in an optional form, the order $2^m$ rendering a maximum code length in each mode minimum fulfills the following expression:

$$(2^m/2^m+1) \leq k < (2^{m+1}/2^{m+1}+1) \quad (6)$$

Therefore, by determining the m in accordance with the expression (6), a substantially optimum code form can be selected.

Assuming that the number of binary ZERO's [0] is $N_O$ and the number of binary ONE's [1] is $N_1$, $$k = (N_0/N_0 = N_1)$$

holds. Thus the expression (6) is reduced to $$2^m N_1 < N_0 \leq 2^{m+1} N_1$$

Figure 9:
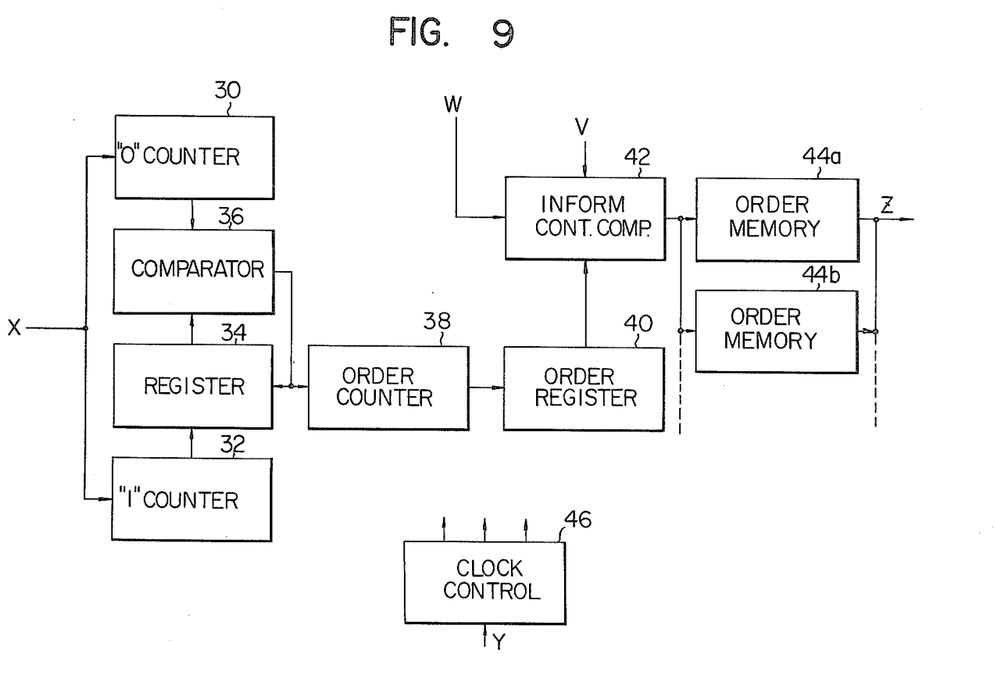
FIG. 9 is a block diagram of a code selection device constructed in accordance with the principles of the present invention.

From the foregoing it is seen that the code selector 24 may be constructed into a circuit configuration as shown in FIG. 9.

The arrangement illustrated in FIG. 9 comprises a ZERO counter 30 and a ONE counter 32 each receiving the output X from the prediction converter 14 (see FIG. 8). The ZERO counter 30 counts ZERO code symbols only put in a specified mode while the ONE counter 32 counts ONE code symbols put in that mode.

Assuming that the encoding order is determined for each line, the count in the ONE counter 32 is transferred to a register 34 connected to that counter each time one line has been entirely investigated to its end. Then the count is transferred to a comparator 36 where it is compared with a count on the ZERO counter 30 transferred to the comparator 36. When the count on the ZERO counter 30 is greater than or equal to that on the ONE counter 32 as determined by the comparator 36, the latter delivers a pulse to both the register 34 and an order counter 38. The order counter 38 counts that pulse and the register 34 shifts its content toward more significant bit positions by one bit position. That is, the content of the register 34 doubles. Then the comparator 36 compares the count on the ZERO counter 30 with the doubled content of the register 34.

The process as above described is repeated until the ZERO counter 30 is smaller in content than the register 34. At that time, the order counter 38 has a count equal to I. If I=0, then the I is made unity (1). Then a figure I−1 is registered in an order register 40.

Where the counting of ONE symbols amounts to a zero, the process as above described proceeds after the counting of ONE code symbols has been made unity (1).

FIG. 9 also shows an information-content comparator 42 adapted to receive the output W concerning the information content of the memory 20, the output V from the maximum order former 26 (see FIG. 8) and an output from the order register 40. Further the comparator 42 is connected to a pair of order memories 44a and 44b provided for two different modes, in this case, the S and W modes.

When the output W from the memory 20 indicates that the length of code word sequence stored in the memory 20 exceeds a predetermined magnitude, the order register 40 transfers the registered length through the comparator 42 to the mode register 44a for the mode with which that length is concerned.

The other order memory 44b is adapted to store information for the other mode.

However when the output W from the memory 20 indicates that the information content thereof is less than the predetermined magnitude, the comparator 42 compares the output from the order register 40 with the output V from the maximum order former 26 and transfers to the order memory 44a the output which is smaller than the other output.

The order of the signals determined as above described is transmitted through the associated transmission channel immediately following the synchronizing signal involved.

FIG. 9 further shows a clock control 46 receiving the output Y from the mode decision device 12 (see FIG. 8) to control the code selector 24 illustrated in FIG. 8, that is to say the components shown in FIG. 9.

The order selection in the other modes is accomplished by operating the components 30 through 40 according to time sharing technique for each mode. Alternatively, equipment may be provided for each mode which functions identically to the combination of the components 30 through 40.

The output Z from the order memory 44a or 44b is applied to the coder 18 (see FIG. 8) to determine the order $2^m$ for encoding.

From the foregoing it will be appreciated that the present invention selects codes fitted for the particular information source without the necessity of actually encoding signals in accordance with predetermined individual code forms. This eliminates the necessity for increasing the processing speed depending on the number of the code forms prepared and also for providing a code length memory.

Further, preparation of particular dummy codes is not required. Therefore codes can be effectively alloted and the receiving side need not be provided with means for extracting the dummy codes.

While the present invention has been described in conjunction with the code group as shown in FIG. 3, it is to be understood that the same is equally applicable to code groups other than the code group of FIG. 3. In the latter case, the code selection means is based on a similar counting of binary symbols.

Figure 10:
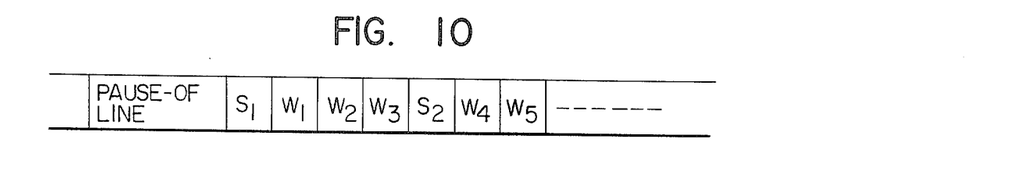
FIG. 10 is an illustration of a transmitted signal sequence used with the arrangement shown in FIG. 8.

The present invention also provides an encoding communication system eliminating the necessity of transmitting a pause-of-mode signal indicating an interval between modes. In other words, code words are transmitted to the receiving side in such a manner that received code words can be readily recognized on the receiving side without insertion of pause-of-mode signals into the transmitted code word sequence. To this end, a mode switching device is provided to control coders so that, by taking account of the address numbers of untransmitted symbol patterns, the outputs from the coders can be sequentially delivered to an associated data transmission channel, starting with the output of the coder for that sequence in which the untransmitted symbol pattern has the least address number. Under these circumstances, code words are transmitted to the channel in the manner as shown in FIG. 10.

More specifically, the process as described above in conjunction with FIG. 5 is repeated until the S and W sequences (see the rows e and f, FIG. 5) are formed. Then, as shown in FIG. 10, a pause-of-line signal is first transmitted and then the code word labelled $S_1$ is delivered to a channel involved. In this case, the address No. 1 is the least among the untransmitted symbol pattern and that pattern having the address No. 1 belongs to the S sequence. Thus the untransmitted symbol pattern having the address Nos. 1, 2, 5 and 8 associated with $S_1$ in FIG. 5e are formed into a bundle to form a code word (0) labelled $S_1$ as shown in the row g in FIG. 5. Thus that code is transmitted following the pause-of-line signal. Thereafter, the address No. 3 is the least untransmitted and that symbol pattern having the least address No. 3 belongs to the W sequence. Accordingly, the code words having the address Nos. 3 and 4 are lumped together to form a code word (0) labelled $W_1$ which is, in turn transmitted immediately after the code (0) labelled $S_1$. Following this, the code words (0), (10), (101), (11) . . . labelled $S_1$, $W_2$, $W_3$, $S_2$, $W_4$, . . . are sequentially delivered to the associated data transmission channel.

From the foregoing it is seen that the modification of the present invention just described includes a device on the transmitting side substantially similar to the prior art practice except that in the present invention it is additionally provided with a sensor circuit for sensing the mode to which the symbol pattern with the least address member remaining untransmitted belongs, with the mode switching device controlled with by an output from the sensor circuit. Since such a sensor circuit may readily be designed by those skilled in the art, the description therefor is omitted.

Figure 11:
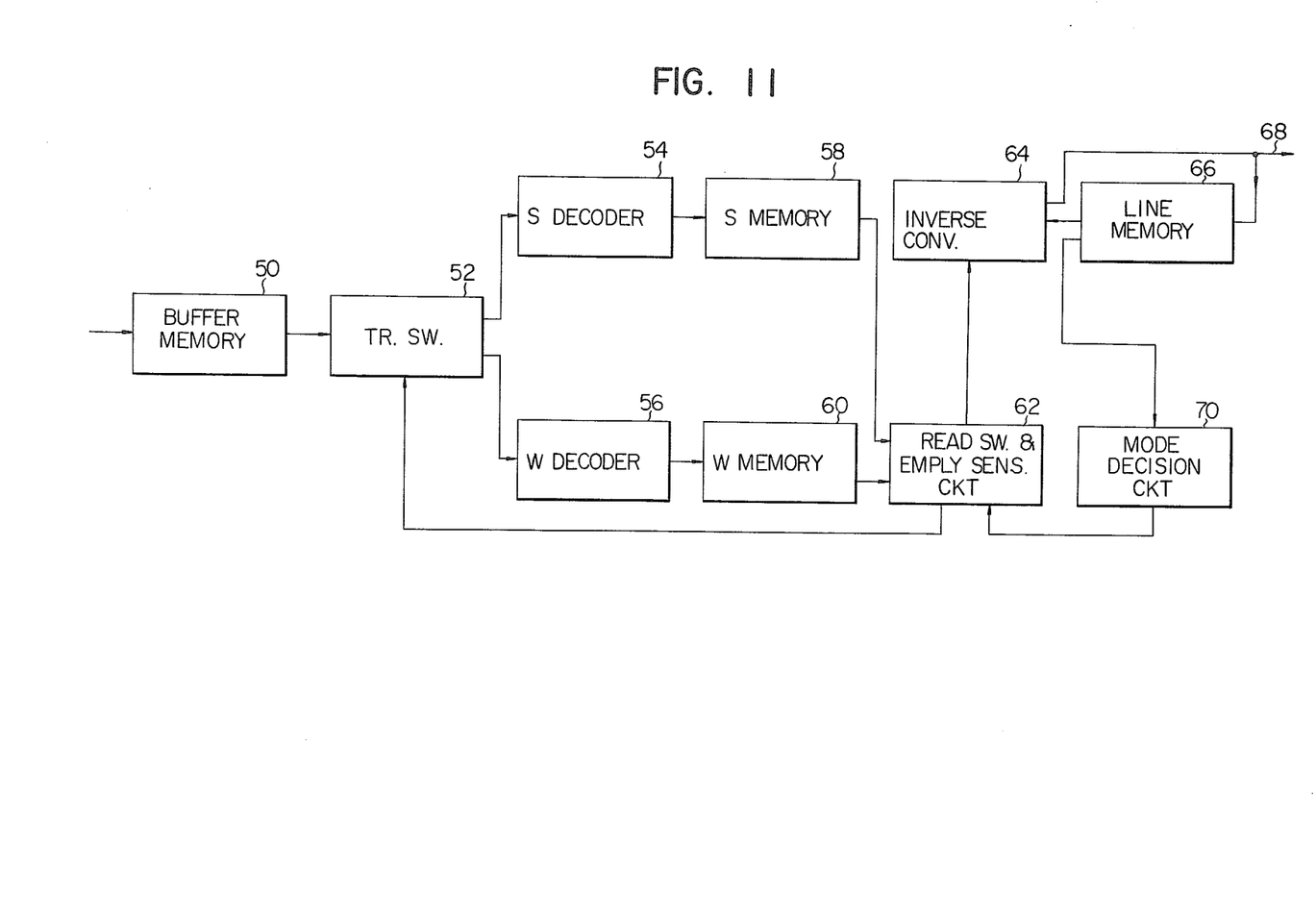
FIG. 11 is a block diagram of a decoding device on the receiving side used with an embodiment of the present invention.

FIG. 11 shows, in block diagram form, a decoder device constructed in accordance with the principles of the present invention suitable for use on the receiving side in the modification of the present invention in which the pause-of-mode signals are not used. The arrangement illustrated comprises a buffer memory 50 for storing code words received and sensed, and a transfer switch 52 connected to the buffer memory 50 and including a pair of output branches. One of the output branches includes an S mode decoder 54 connected to the transfer switch 52 and an S mode memory 58 connected to the decoder 54 to store decoded signals in the S mode. The other output branch includes a W mode decoder 56 connected to the transfer switch 52 and a W mode memory 60 connected to the decoder 56 to store decoded signals in the W mode.

Then both mode memories 58 and 60 are connected to a combined read switching and empty sensing circuit 62 having one output connected to the transfer switch 52. The circuit 62 has another output connected to an inverse conversion circuit 64 subsequently connected to a line memory 66 and an output terminal designated by the reference numeral 68. The line memory 66 includes a pair of outputs connected to the circuit 64 and a mode decision circuit 70 respectively. The mode decision circuit 70 is connected to the combined read switching and empty sensing circuit 62.

The line memory 66 stores decoded signals resulting from all picture elements included in each line and applies signals A, B and C to the inverse conversion circuit 64 to form a prediction signal $\hat{X}$ (2). As previously described, the signals A, B and C originate from the reference picture elements A, B and C as shown in FIG. 1. The line memory 66 also applies signals A, B, and D to the mode decision circuit 70 to determine the mode in accordance with equations (1) and (1'). As described above, the signal D originates from the reference picture element D shown in FIG. 1. A mode signal from the mode decision circuit 70 indicating the decided mode is supplied to the combined read switching and empty sensing circuit 62. That mode signal causes the circuit 62 to read a decoded signal from the S memory 58 or the W memory 60 as directed by the mode signal.

The decoded signal Y read out by the circuit 62 is delivered to the inverse conversion circuit 64 where it is converted to a decoded signal X for the object picture element X (see FIG. 1) in accordance with the expression $$X = \hat{X} \oplus Y$$

where the symbol "cross in circle" has already been defined in relation of equation (3). The decoded picture element signal X thus read is written in the line memory 66 and simultaneously delivered through the output terminal 68 to an associated reproducing system (not shown).

If the circuit 62 can not read the decoded signal in the mode determined by the mode decision circuit 70 from the corresponding memory 58 or 60 because the latter is clear of such a signal and empty then circuit 62 applies an empty memory signal to the transfer switch 52. This means that a signal read from the buffer memory 50 has been determined to be that code word in the mode requested by the mode decision circuit 70. Therefore the transfer switch 52 connects the buffer memory 50 to that decoder for the directed mode. For example, assuming that the mode S is determined by the mode decision circuit 70, the S decoder 54 is connected to the buffer memory 50 through the transfer switch 52 to read and decode the code word received from the memory 50 and to write it in the S memory 56. Thus the read switching portion of the circuit 62 reads the decoded signal in the S mode from the S memory 56. This is also true in case the W mode is determined by the mode decision circuit 70.

Note that S memory 58 and W memory 60 need only have a memory capacity sufficient to store a $2^m$-bit decoded signal therein.

From the foregoing it is seen that in the present invention comprising the arrangement of FIG. 11, the outputs from the coders disposed on the transmitting side are sequentially transmitted to the receiving side so as to first transmit to the receiving side the output from the coder for the mode having an untransmitted symbol pattern with the least address number and then the output from the coder for the mode having the remaining untransmitted symbol pattern with the least address number and so on. Thereby information concerning the modes can readily been separated on the receiving side with a simple circuit configuration without using a pause-of-mode signal.

In summary, the present invention provides an encoding communication system for transmitting facsimile signals in a limited frequency bandwidth as rapidly as possible without the necessity of interposing dummy codes and pause-of-mode signals between the facsimile signals.

While the present invention has been illustrated and described in conjunction with a few preferred embodiments thereof it is to be understood that numerous changes and modifications may resorted to without departing from the spirit and scope of the present invention. For example, the present invention is equally applicable to the transmission of information other than facsimile information.

What we claim is:

1. An encoding communication system for facsimile signals comprising: means for sequentially obtaining prediction signals from picture elements adjacent to object picture elements in accordance with a predetermined prediction function; means for comparing said prediction signals with signals from corresponding ones of said object picture elements to generate a sequence of prediction error signals; means for encoding and transmitting said signal sequence of prediction error signals; said means for encoding and transmitting including: a sensor means for sensing if the length of a code word sequence to be transmitted is less than a constant value determined by the delivery rate at which codes are delivered to a transmission channel; a count comparison means for counting respective binary 0's and 1's in a sequence of signals to be encoded, for effecting a calculation determined by the resulting counts and for comparing the result of said calculation with a value determined from said constant value determined by the delivery rate and said resulting counts; and a code selection means for selecting one of a plurality of preliminarily prepared code forms in accordance with an output from said count comparison means.

2. An encoding communication system for facsimile signals comprising: means for sequentially obtaining prediction signals from picture elements adjacent to object picture elements in accordance with a predetermined prediction funtion; means for comparing said prediction signals with signals from corresponding ones of said object picture elements to encode a sequence of prediction error signals; means for encoding and transmitting said signal sequence of prediction error signals; said means for encoding and transmitting including: a sensor means for sensing if the length of a code word sequence to be transmitted is less than a constant value determined by the delivery rate at which codes are delivered to a transmission channel; a code selection means for counting a value $m_1$ determined by said delivery rate and the number of symbols to be encoded, for counting respective binary 0's and 1's in a sequence of signals to be encoded to provide counts $N_0$ and $N_1$, for determining a non-negative integer I fulfilling the relationship $$2N_1 \leq N_0 < 2^{I+1} \cdot N_1$$

where $N_0 \geq N$ is assumed, and for comparing said $m_1$ with said I in accordance with an output from sensor means to thereby newly determine m; and an encoding means for imparting a 1-bit code word to a pattern including $2^m$ symbols continuous to one another, said symbols having the count $N_0$, and for imparting an (m+1) bit code word to a pattern including a single symbol with the count $N_1$ following X symbols with the count $N_o$ where X is an integer holding $0 \leq X \leq 2^m - 1$.

3. An encoding communication system for facsimile signals comprising means for sequentially obtaining prediction signals from picture elements adjacent to object picture elements in accordance with a predetermined prediction function; means for comparing said prediction signals with signals from corresponding ones of said object picture elements to generate a sequence of prediction error signals; means for encoding and transmitting said signal sequence of prediction error signals; said means for encoding and transmitting including: a mode selection circuit for selecting any one of a plurality of code forms predetermined by a pattern of adjacent picture elements upon encoding; an encoding means for encoding said prediction error signals on the basis of said code form selected by said mode selection circuit; and a mode switching means for sequentially transmitting said coded signals, starting with the coded signal in the mode having an untransmitted symbol pattern with the least address number among said signals to be encoded.

* * * * *